June 7, 1949.  H. C. PAULSEN  2,472,228
TRIMMING MACHINE

Filed March 29, 1947  5 Sheets-Sheet 1

Inventor
Hans C. Paulsen
By his Attorney

June 7, 1949. H. C. PAULSEN 2,472,228
TRIMMING MACHINE
Filed March 29, 1947 5 Sheets-Sheet 3

Inventor
Hans C. Paulsen
By his Attorney

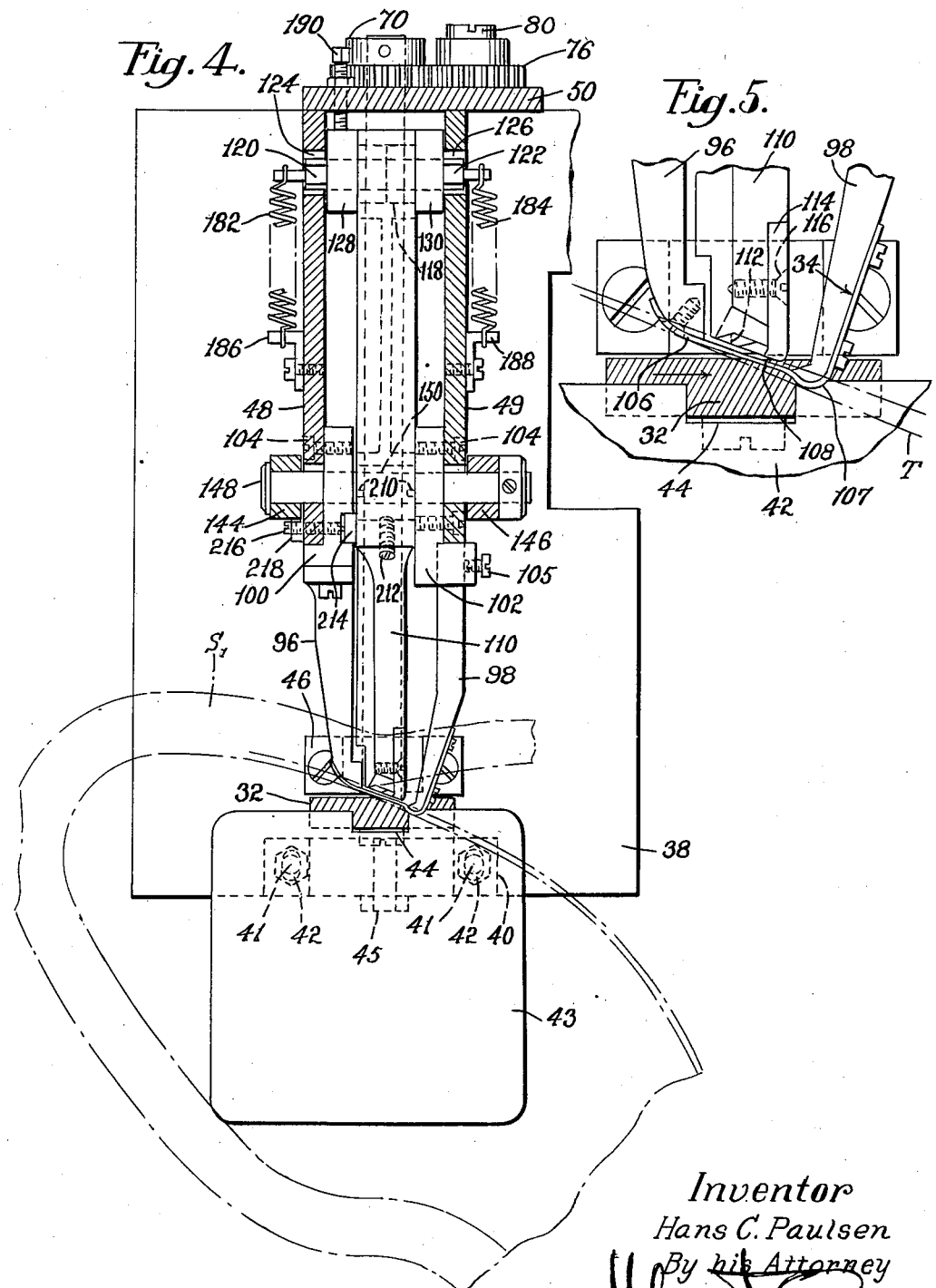

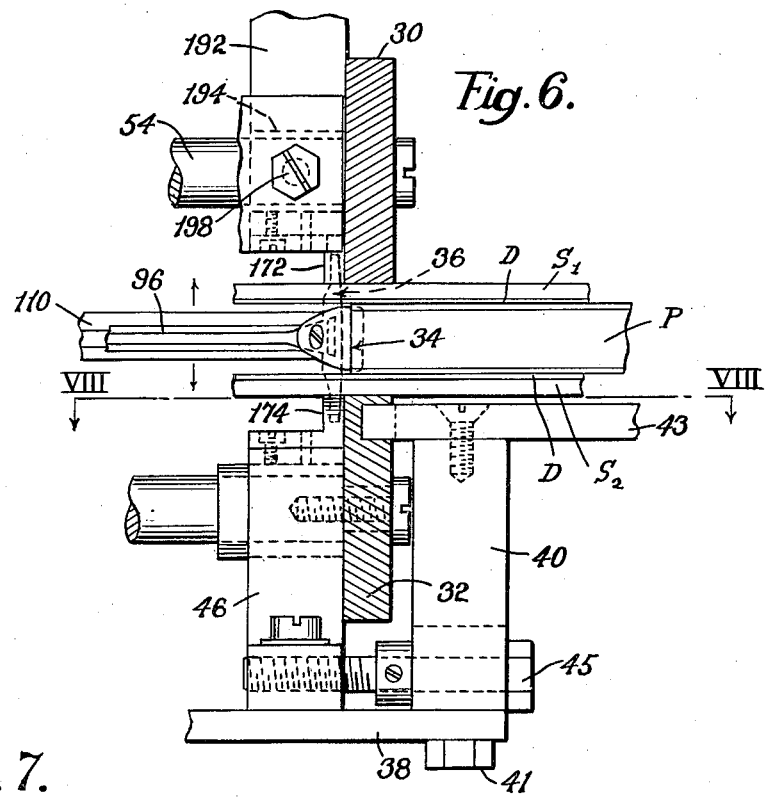
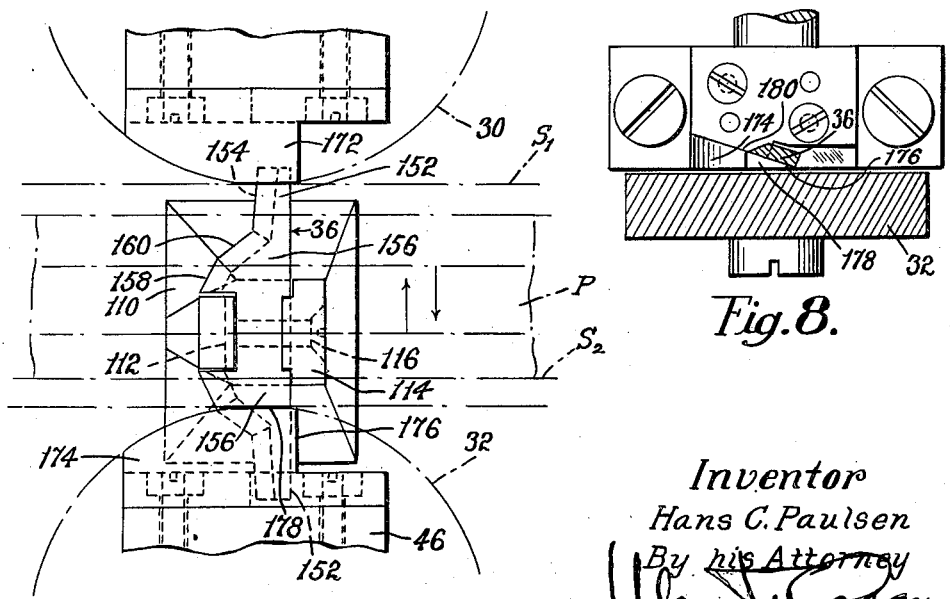

Patented June 7, 1949

2,472,228

UNITED STATES PATENT OFFICE 2,472,228

TRIMMING MACHINE

Hans C. Paulsen, Medford, Mass., assignor to United Shoe Machinery Corporation, Flemington, N. J., a corporation of New Jersey Application March 29, 1947, Serial No. 738,045

22 Claims. (Cl. 12—85)

This invention relates to trimming machines, and more particularly to a machine adapted for simultaneously trimming right and left work pieces of a pair in conformity to a single pattern. By way of example, the invention is disclosed herein with reference to the trimming of insoles for shoes; but it is to be understood that the invention may have application to the trimming of other kinds of shoe parts, or any other work pieces either in pairs or singly.

The type of machine usually employed for trimming soles has a knife which is drawn around the periphery of a pattern to which a sole is clamped. The effectiveness of the cutting action of the knife in this type of machine depends partly upon a certain amount of rigidity in the material being trimmed, and also upon the sole's being held firmly adjacent to the line of cut against movement away from the pattern under the pressure of the knife. Accordingly, it is customary to provide a relatively large number of clamps so that, in operating upon a run of sizes of soles, a clamp may be selected so near in size to that of the pattern that the unclamped area of any sole, inside the line of cut, will be small. This practice calls for a considerable number of clamps, the need for which it is one object of the present invention to avoid.

When the only movement of a knife which causes its cutting action is its feeding movement, as in the case of the type of machine referred to above, the knife must constantly be kept in a well sharpened condition. Even so, it is difficult to trim certain kinds of soft stock. Another type of work which gives rise to a difficulty in trimming is the case of a laminated insole which has a reinforcement of duck or similar fabric applied to one side of the usual leather element. In trimming such work pieces the fabric tends to fray and the operation is rendered expensive because of the necessity for repeatedly resharpening the knife.

In view of the foregoing, it is a general object of the invention to provide a simple and effective machine capable of performing satisfactorily any of the trimming operations referred to above and in which the need for separate work clamping elements of various sizes is eliminated.

The invention is disclosed herein with reference to the simultaneous trimming of a pair of insoles of the type described in an application for United States Letters Patent Serial No. 717,121, filed December 19, 1946, in the name of Stanley M. Griswold, while the insoles are temporarily secured to the sides of a matrix or pattern of the type disclosed in an application for United States Letters Patent Serial No. 717,122, filed December 19, 1946, in the names of Stanley M. Griswold and Hans C. Paulsen. In accordance with one feature of the invention, the illustrative machine is provided with a vibrating knife having opposed blades, each of which is arranged to trim one of the soles, the soles being guided relatively to the knife by the engagement of the pattern with a guide, the margins of the soles being supported at their outer sides against the cutting action of the knife by supports which are engaged by the knife. Each sole is thus supported adjacent to the line of cut by the pattern on one side, and by one of the supports on the other side. Moreover, the vibratory cutting action of the knife, which is directed crosswise of the edges of the pattern and the soles, causes the knife to cut effectively for a long period of time beyond that when it would have to be sharpened if its cutting action were derived merely from a feeding movement between the work and the knife.

Although the work may be presented and fed by hand to the guide and knife as set forth above, it is preferably moved and guided by the machine itself to cause a complete transfer of the point of operation of the knife on the soles around the pattern. To this end, the illustrated machine comprises an improved guide, in which invention is to be recognized, with which cooperates a feeding means which both feeds the work past the guide and holds the pattern against the guide with the edge of the pattern adjacent to the knife always in substantially the same relation to the knife.

A further feature of the invention resides in the provision for relative yielding movement between the above mentioned supports to accommodate sole-pattern assemblies of different thicknesses, in combination with an adjustment by which the supports and knife can be relatively adjusted along the path of the knife in order to equalize its cutting action upon the soles.

The above and other features relating to the construction and arrangement of the operating instrumentalities which further contribute to the effectiveness of their trimming function will now be explained in connection with the accompanying drawings and will be defined in the claims.

In the drawings:

Fig. 4 is a sectional plan view of a part of the structure of Fig. 2, the section being taken along the line IV—IV of Fig. 2;

Fig. 5 is a plan view illustrating at an enlarged scale the knife and other operating instrumentalities adjacent thereto;

Fig. 6 is an enlarged side elevation of the operating instrumentalities with a sole-pattern assembly in operative relation thereto;

Fig. 7 is an enlarged front elevation of a part of the structure shown in Fig. 6 and illustrating diagrammatically the operative relation between the sole-pattern assembly and the operating instrumentalities; and Fig. 8 is a plan view of certain parts of the structure shown in Fig. 6 at and below the level of the line VIII—VIII.

Figure 1:
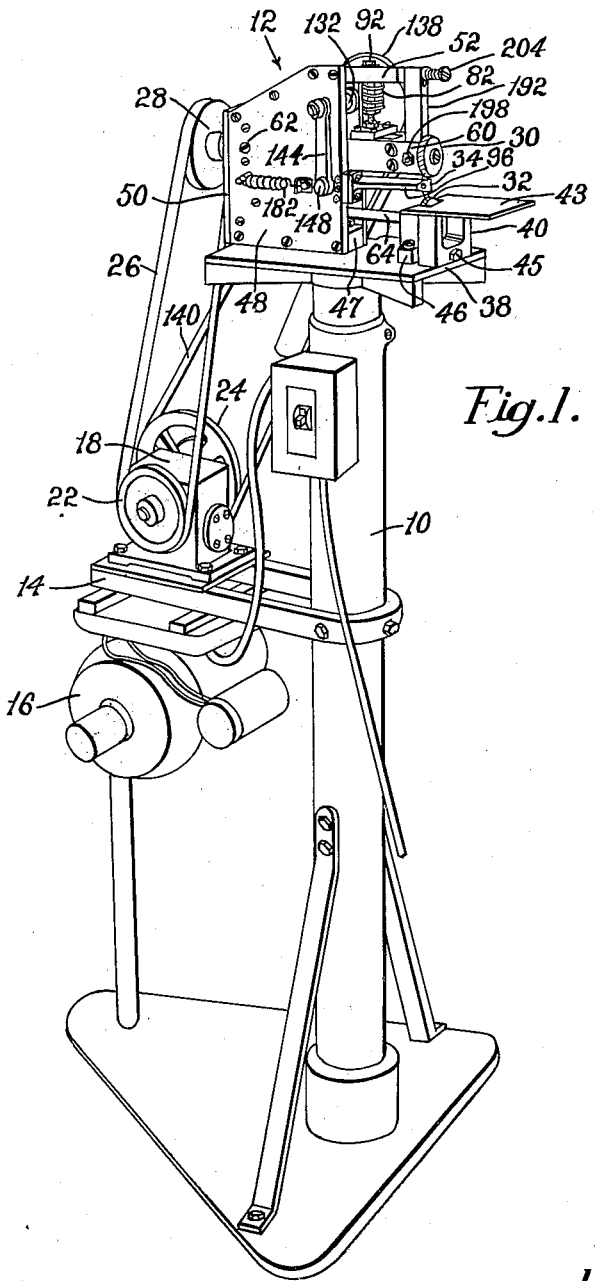
Fig. 1 is a view in perspective of an illustrative machine embodying the invention.

The illustrated machine comprises a stand 10 (Fig. 1) adapted to support at its upper end an operating head 12, and at its mid-portion, a bracket 14 on which a motor 16 is mounted. A reduction-gear unit 18 is also carried by the bracket 14 and is belt-connected to the motor 16, the output of this unit being taken from pulleys 22, 24 fixed to shafts which are driven at different speeds. The pulley 22 is connected by a belt 26 to another pulley 28 which, through connections later to be described, cause upper and lower feed rolls 30, 32 respectively to be rotated in opposite directions so as to impart a feed movement to the work disposed between them.

The work, as presented to the illustrated machine, comprises a pair of insole blanks $S_1$, $S_2$ (Fig. 6) of the type disclosed in the above-mentioned Griswold application, each blank having a layer of duck D covering the side from which the sewing rib extends. The usual sewing ribs on the soles are inserted in grooves in a matrix or pattern P of the type disclosed in the above-mentioned Griswold and Paulsen application, the soles in this way being adequately secured to the pattern for the purpose of trimming them. For purposes of describing and defining the invention, the term "sole" as employed herein is to be regarded as designating an insole, outsole, or other work piece, regardless of whether it is untrimmed, partially or completely trimmed as will be understood from the context. The expression "sole-pattern assembly," or simply "assembly," is intended to designate a pattern to one or each side of which a sole, as defined above, is removably secured.

The feed rolls 30, 32 yieldingly grip the free or outer sides of the soles at points directly opposite each other, hold the margins of the soles against the pattern, and are arranged, when rotated, to feed the sole-pattern assembly past a guide 34 in such a manner that the pattern is continually held in contact with the guide.

While the assembly is fed in the manner described, the soles $S_1$ and $S_2$ are simultaneously trimmed in conformity to the pattern P by a rapidly vibrating and double-bladed knife 36, each blade of which trims one of the soles. As will be more fully explained later, during a complete transfer of the point of operation of the knife about the assembly, the assembly is swung automatically for the most part, but with the assistance of the operator at certain times, so that the relation between the direction of the feed movement and the knife is maintained substantially the same regardless of the changing contour of the pattern. The finished soles, as trimmed by the illustrated machine, conform exactly to the shape of the pattern P except for the fact that the edges of the soles extend beyond the pattern P to an extent of about $\frac{1}{32}$ of an inch or less.

Having briefly outlined the operating characteristics of the machine, the construction of the operating head 12 will now be described in detail. To the top of the stand 10 is fixed a plate 38 which constitutes a base for the head 12. A U-shaped support 40 is fixed to the plate 38 by means of screws 41 which are threaded into the support and pass through elongated slots 42 (Fig. 4) in the plate 38. The support 40 carries at its upper ends a table 43, the level of which is slightly below the uppermost part of the lower feed roll 32. The table has a throat 44 (Fig. 5) through which the upper part of the roll 32 extends. The throat is deep enough to permit limited adjustment of the table axially of the roll by turning a screw 45 (Figs. 2 and 6) which is threaded into a bearing block 46 fixed to the plate 38. The frame of the head 12 comprises a block 47 fixed to the plate 38, two side plates 48, 49 and an end plate 50 which are fixed to the block 47, and a bar 52 to which all the above-mentioned plates are connected at their upper margins.

The above-mentioned pulley 28 and feed roll 30 (Fig. 2) are fixed to the opposite ends of a shaft 54 which is rotatably mounted in bearings 56, 58 at the ends of a rectangular sleeve 60. The sleeve 60 fits closely, but so as to move freely, between the side plates 48, 49 and is mounted to swing in a vertical plane on trunnion screws 62 which are threaded into the side plates 48, 49 and have conical ends which are seated in similarly shaped recesses in the sleeve 60. The feed roll 32 is fixed to a shaft 64 which, adjacent to the feed roll, is journaled in the bearing block 46. The other end of this shaft runs in a bearing 68 which is secured to the side plates 48, 49, the outer end of the shaft having fixed thereto a gear 70. This gear is the same size as another gear 72 which is fixed to the shaft 54, these two gears being connected by a meshing pair of gears 74, 76 which are rotatably mounted on studs 78, 80 respectively, the studs being threaded into the end plate 50.

In order to accommodate a sole-pattern assembly of any thickness and to cause it to be firmly gripped between the feed rolls 30, 32 regardless of variations in its thickness the upper roll 30 is urged downwardly by a pair of springs 82, 84, the upper ends of which abut the bar 52. The lower ends of these springs seat on a washer 86 which is supported by a nut 88, the latter being threaded on a bolt 92 which is threaded into another nut 94 secured to the sleeve 60. By adjusting the bolt 92, it is evident that the lowermost position of the feed roll 30 can be controlled; and the pressure of the feed roll 30 against the sole-pattern assembly may be varied by adjusting the nut 88 on the bolt 92 which changes the compressive stress of the springs 82, 84.

The guide 34 (Figs. 2, 4 and 5) consists of a thin strip of metal, somewhat narrower than the pattern P is thick, which is fixed to the outer ends of a pair of struts 96, 98, the latter being secured to a pair of bearing blocks 100, 102, respectively. These blocks are secured to the side plates 48, 49 respectively by screws 104. The guide 34 is thus mounted between the nearer portions of the feed rolls 30, 32 and at such a height as to permit the soles $S_1$ and $S_2$ to extend across the guide above and below it with a slight clearance when the lower sole $S_2$ is resting upon the lower roll 32 and table 48. In order to permit the closest possible relation between the knife 36 and the guide 34, the guide may be flexed somewhat toward or away from the knife by adjusting the strut 98 lengthwise thereof in the block 102. A setscrew 105 threaded in the block 102 bears against the strut 98 to hold it in adjusted position.

As best illustrated in Fig. 5, the guide has two convex shoulders 106, 107 where it covers the ends of the struts 96, 98 and between these shoulders is a straight portion 108 which in connecting the crest of the shoulder 106 with the base of the shoulder 107 gradually diverges from a common tangent T to the shoulders. The relation between the guide 34 and the feed rolls 30, 32 is such that the feeding force imparted by the rolls to the sole-pattern assembly is directed between the shoulders 106, 107. The feeding force is thus utilized to cause the pattern always to be held against the guide 34, as well as to feed the sole-pattern assembly past the guide. In spite of the changing contour of the pattern the direction of its feed movement is always approximately that of the tangent T. As the pattern is moved past the guide, the trailing point of contact between the pattern and the guide (at the shoulder 107) remains substantially fixed. However, the leading point of contact of the pattern with the guide moves along the shoulder 106 and straight portion 108 toward the shoulder 107 as the curvature of the pattern becomes more abrupt. Although the point of operation of the knife on the sole is thus brought slightly nearer to the pattern, owing to the very slight divergence between the recessed portion 108 and the tangent T, the variation in the extension of the trimmed sole edge beyond the pattern at different points about its periphery is negligible. When the most sharply curved portions of the pattern at its toe and heel ends pass the guide, the operator will assist in the guiding of the assembly to maintain the point of contact of the pattern with the guide directly opposite to the knife.

While the sole-pattern assembly is thus fed past the guide 34 the knife 36 is rapidly vibrated crosswise of the edge of the pattern and trims both soles simultaneously. The knife is mounted closely adjacent to the side of the guide 34 opposite to that engaged by the pattern P on the end of a carrier constituted by a lever 110. For this purpose the lever is provided with a half-dovetail recess 112 which receives the left-hand edge of the knife. A clip 114, secured to the lever 110 by a screw 116, overlaps the right-hand edge of the knife which is provided with a half-dovetail surface at the base of a shallow notch adapted to receive the clip. The lever 110 is pivotally mounted at its rear end to swing vertically on a shaft 118 having reduced flattened ends 120, 122 which are arranged to slide horizontally in elongated slots 124, 126 respectively, formed in the side plates 48, 49. Collars 128, 130 are disposed, one at each side of the lever 110, to maintain the latter and the shaft 118 in a central position between the side plates.

The lever 110 is rapidly oscillated about the shaft 118 by mechanism which will now be described in detail. A drive shaft 132 (Figs. 2 and 3) is rotatably mounted in bearings 134, 136 in the side plates 48, 49 respectively, and has mounted on one end thereof a pulley 138 which is driven by a belt 140 (Fig. 1) adapted to run on the above-mentioned pulley 24. The shaft 132 near its ends is provided with a pair of eccentrics 140, 142 on which are mounted a pair of connecting rods 144, 146 respectively, the lower ends of the latter being bored to receive a stud 148. This stud passes through clearance holes in the side plates 48, 49 and in the bearing blocks 100, 102 but is received with a close running fit within an eccentric bushing 150 carried by the lever 110. It will now be evident that when the shaft 132 is rotated, the knife 36 will be oscillated with a predetermined stroke alternately toward and away from each of the feed rolls 30, 32.

Each of the blades of the knife has a pilot portion 152 (Fig. 7) having a substantially vertical cutting edge 154 made by a bevel which is on the side of the knife remote from the guide 34. Between these pilot portions and the part of the knife which is secured to the lever 110 are shearing portions 156 having edges 158, 160 formed by a bevel like that on the pilot portion 152, these edges being disposed at different inclinations to the direction of oscillation of the knife as shown in Fig. 7. Each blade of the knife is long enough so that it always remains entirely within the kerf in the sole which it trims. This relation is illustrated in Fig. 7 in which the upper blade of the knife extends above the sole $S_1$ when the knife is in the lowermost part of its stroke. The surface of the knife 36 adjacent to the guide 34 is arcuate for a purpose which will be pointed out later, and is concentric with the axis of the shaft 118 about which the knife oscillates.

The soles $S_1$ and $S_2$ are supported against the thrust of the knife 36 immediately adjacent to the knife and inwardly from the line of cut by supports or shear blocks 172, 174, respectively, the latter block being fixed to the bearing block 46. As viewed in Fig. 7 the shear block 174 has an upper sole engaging surface one part of which conforms substantially to the curvature of the feed roll 32 and terminates in a vertical edge 176 close to the rear edge of the knife 36. The uppermost portion of this shear block is flattened at 178 making its level at this point very slightly below the uppermost portion of the feed roll 32 so as to provide a support for the sole $S_2$ against the downward thrust of the lower blade of the knife without tending materially to retard the feed movement of the sole-pattern assembly.

The inner side 180 of the shear block 174 (Fig. 8) is inclined in the direction of feed toward the feed roll 32; but the side 180 diverges from the tangent T in the direction of feed, as indicated by the relation of the dot and dash lines in Fig. 5. Accordingly, the cutting action of the knife is directed inwardly of the sole and the direction of feed at all times with the result that the knife tends to bite into the sole rather than to run out of it. While only the shear block 174 has been described in detail, it is to be understood that the shear block 172 and its relation to the upper blade of the knife are similarly constructed and arranged.

The knife 36 is yieldingly held with its outer arcuate side in engagement with the sides of the shear blocks 172, 174 by the action of a pair of springs 182, 184 (Figs. 2 and 4) which are connected to projections extending from the ends 120, 122 respectively of the shaft 118. Owing to the curvature of the outer side of the knife 36, it remains in contact with the adjacent sides of the shear blocks 172, 174 throughout its oscillation without causing any movement of the lever 110 lengthwise of itself. The fixed ends of the springs are carried by hooks 186, 188 which are secured to the side plates 48, 49 respectively. It is now evident that the edges of the shear blocks formed by the intersection of their inner sides and sole-engaging surfaces contribute to the shearing action of the knife. In order to prevent the knife from being moved away from the shear blocks, as, for example, when a sole-pattern assembly is first presented to the machine, a set screw 190 threaded in the end plate 50 is normally positioned just out of contact with the collar 128 on the shaft 118.

Figure 2:
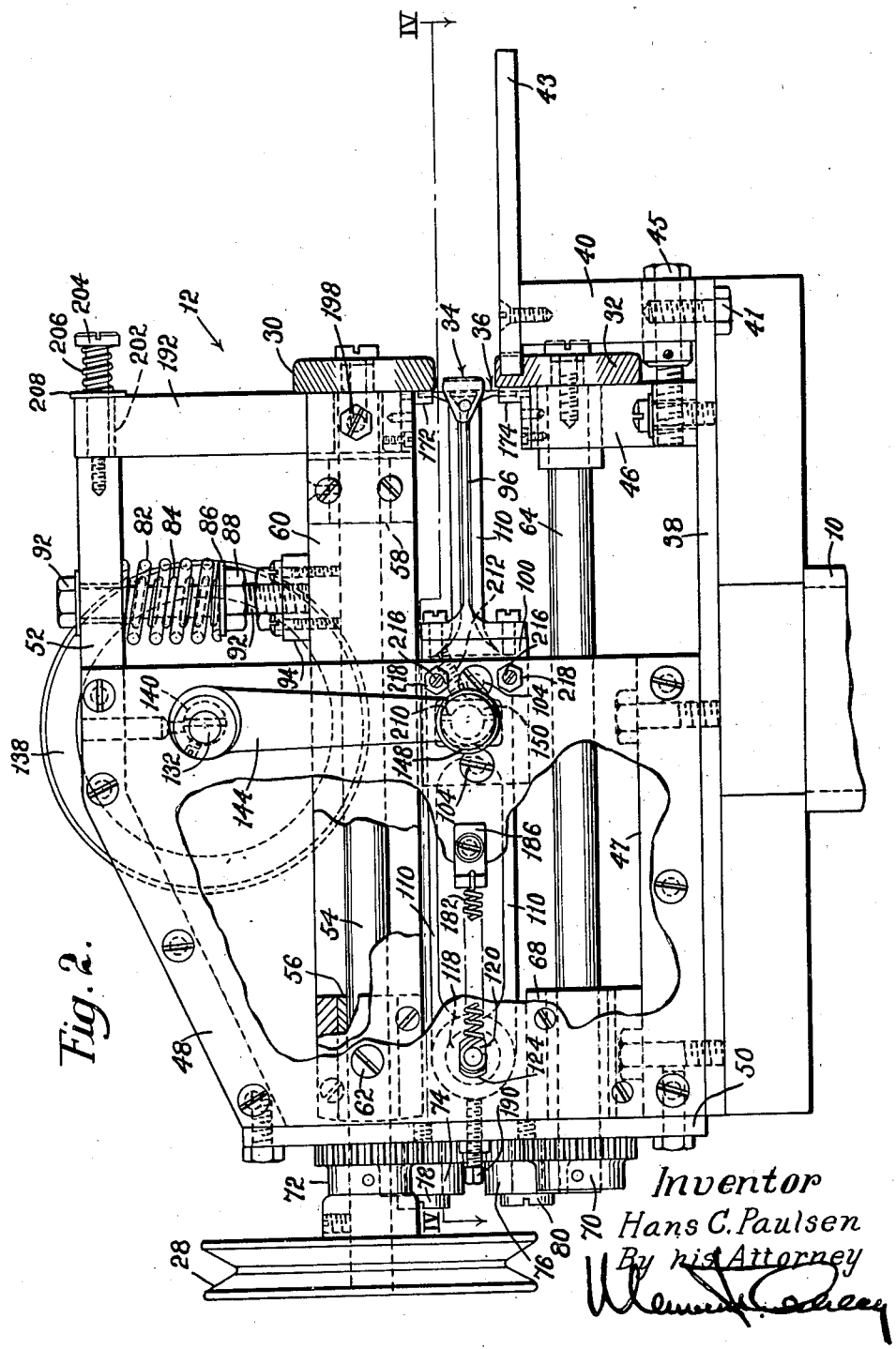
Fig. 2 is a side elevation of the head of the machine, certain parts of which are broken away.
Figure 3:
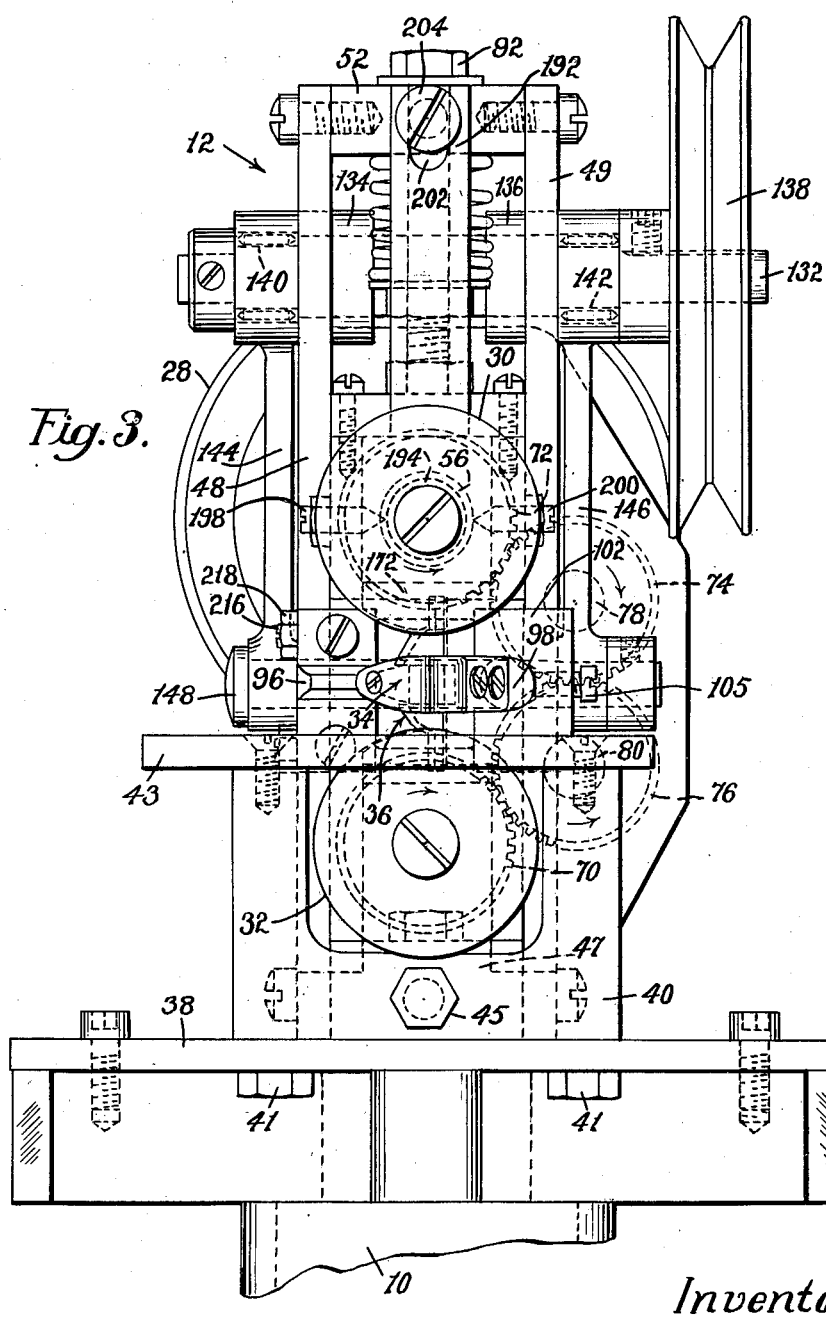
Fig. 3 is a front elevation of the structure shown in Fig. 2.

The upper shear block 172 is mounted to yield with the sleeve 60 and the feed roll 30 in response to variations in the thickness in the sole-pattern assembly. Throughout this yielding movement of the block 172, its edge is maintained substantially in the curved path of oscillation of the knife, as will now be described in detail. The block 172 is fixed to the lower squared end of a bar 192 (Fig. 3) having a clearance hole 194 (Fig. 6) through which the shaft 54 extends. The bar 192 is mounted to pivot between the sides of the sleeve 60 on a pair of trunnion screws 198, 200 threaded in the sleeve and having conical points adapted to be seated in similar recesses in the lower end of the bar. The upper end of the bar 192 is provided with an elongated slot 202 which is large enough to receive a screw 204 freely, the screw being threaded into the end of the bar 52. The bar 192 is held yieldingly against the bar 52 a spring 206 which at one end abuts the head of the screw 204 and at the other end seats on a washer 208 which engages the bar 192. It will now be apparent that as the shear block 172 rotates with the sleeve 60 about the axis of the trunnion screws 62, it also swings about the screws 198, 200 crosswise of the path of the knife. For example, if the sleeve 60 moves upwardly from the position in which it is illustrated in Fig. 2 the bar 192 is swung slightly in a clockwise direction about the trunnions 198, 200 whereby the shearing edge of the block 172 is maintained in engagement with the knife 36. Thus, the shear block 172 is always held in substantially the same relation to the work and the knife 36, regardless of the movements of the sleeve 60 about the trunnion screws 62.

Referring now to Fig. 7, and considering the cutting action to take place upon the sole S1 as the knife rises, the sole will be cut ordinarily by a shearing action between the shear block 172 and the knife edges 160 and 158, although such shearing action may be preceded by a slashing action of the edge 154 if the feed movement is sufficient to advance the end of the kerf made by the preceding cut of this blade against the edge 154 before the edge 160 comes into action. Usually, the speed of feed will be such that the cutting is done by the edges 160 and 158, the knife being oscillated so rapidly (at a frequency of about 3500 vibrations per minute) that the sole edges will be trimmed by a succession of relatively minute cuts.

It is evident from Fig. 7 that as the total thickness of the sole-pattern assembly varies, depending upon whether the soles are thinner or thicker than as illustrated, the uppermost surface of the sole S1 will also vary heightwise from the position illustrated. Such a change in the heightwise position of the sole S1 for a given position of the stroke of the knife would obviously cause an unbalanced state in the action of the two blades of the knife on the soles. Accordingly, provision is made in the machine for adjusting the stroke of the knife so that its midpoint may be alined with a point equidistant between both soles (i. e., the center line of the pattern P). For this purpose the bore in the above-mentioned bushing 150 (Fig. 4) which receives the stud 148, is formed eccentrically with respect to the outer surface of the bushing. The bushing is also provided at its edges with slots 210 adapted to receive a key for rotating the bushing as desired within the lever 110, whereupon the bushing may be locked in adjusted position by tightening a setscrew 212 which is threaded in the lever 110 and bears against the bushing. The lever 110 is guided laterally by a bearing surface formed on the inner side of the bearing block 102 and also by a shim 214 which is seated in a recess in the bearing block 100. Provision for adjusting the shim 214 is made by the use of setscrews 216 which are threaded into the side plate 48 and are adapted to be locked thereto by check nuts 218.

The operation of the illustrative machine will now be summarized briefly. By adjusting the screw 92 the normal height of the feed roll 30 is set so that the distance between this roll and the lower roll 32 is somewhat less than the total thickness of the sole-pattern assembly to be presented to the machine. The nut 88 is next adjusted so as to stress the springs 82, 84 to the extent necessary to insure that the pressure of the feed rolls 30 and 32 on the assembly will afford a satisfactory feeding action. If necessary, the throw of the knife 36 will also be adjusted by changing the position of the bushing 150 in the lever 110 so that the midpoint of the throw of the knife will be half way between the soles on the pattern.

With the feed rolls 30, 32 and knife 36 in operation, a sole-pattern assembly is inserted into the bite of the rolls, whereupon the feed roll 30 is displaced upwardly to accommodate the thickness of the sole-pattern assembly. The feeding action of the rolls causes the pattern P to be moved into engagement with the guide 34, the assembly thereafter being turned by the guiding action of the guide and the operator so that the direction of the feeding movement corresponds at all times to the direction of the edge of the pattern where it engages the guide.

During each stroke of the knife 36, one of its blades cooperates with the associated shear block to make a cut in the edge of one of the soles by which the kerf in it is advanced by an amount equal to the distance through which the sole is fed between successive strokes of the knife. The frequency of vibration of the knife is so high with regard to the speed of the feed movement that the separate cuts of the knife merge without leaving any perceptible roughness or ridges between the cuts. Because of the thinness of the guide 34 and the closeness of the knife to the guide, the trimmed edge of each sole extends only about $\frac{1}{32}$ of an inch beyond the edge of the pattern.

The accurate trimming of each sole edge, in the manner just described, is furthered by mounting the knife and shear blocks so that their cutting action is directed inwardly of the edge of the sole. This action of the knife, and the pressure of the trimmings against the knife all tend to hold the knife firmly, although yieldingly, against the shear blocks 172, 174, and to hold the pattern against the guide 34. For the same reasons, the knife always tends to run into the sole rather than out of it, further insuring that the sole edge will be trimmed strictly in conformity to the shape of the pattern.

Having thus described my invention, what I claim as new and desire to secure by Letters Patent of the United States is:

1. In a machine for simultaneously trimming right and left soles of a pair in conformity to a pattern to each side of which a sole is fixed with its margin extending beyond the edge of the pattern, opposed supports arranged to engage the margins of the soles at their outer sides, a knife having oppositely disposed blades mounted in engagement with said supports, a guide adapted to be received between the margins of the soles and to be engaged by the edge of the pattern, and means for vibrating said knife crosswise of the edge of the pattern.

2. In a machine for simultaneously trimming right and left soles of a pair in conformity to a pattern to each side of which a sole is fixed with its margin extending beyond the edge of the pattern, opposed supports arranged to hold the margins of the soles against the pattern, a knife having spaced blades each of which engages one of said supports, a vibrating carrier for said knife, the mid-portion of said knife between its blades being fixed to said carrier, and a guide adapted to be received between the margins of the soles and to be engaged by the edge of the pattern.

3. In a machine for simultaneously trimming right and left soles of a pair in conformity to a pattern to each side of which a sole is fixed with its margin extending beyond the edge of the pattern, a guide adapted to be received between the margins of the soles and to be engaged by the edge of the pattern, a knife having blades arranged to project in opposite directions beyond said guide and through the soles on a pattern presented to said guide, a carrier to which said knife at a point between its blades is fixed, and spaced supports arranged to receive the sole-pattern assembly therebetween and to hold the margins of the soles against the pattern, said carrier being mounted to vibrate within the space between the planes of the sole engaging surfaces of said supports.

4. In a machine for simultaneously trimming right and left soles of a pair in conformity to a pattern to each side of which a sole is fixed with its margin extending beyond the edge of the pattern, a guide adapted to be engaged by the edge of the pattern, a pair of supports for holding the margins of the soles against the pattern, a knife having a pair of blades each of which engages a side of one of said supports, means for urging said knife against said supports, and means for vibrating said knife crosswise of the edge of the pattern.

5. In a machine for simultaneously trimming right and left soles of a pair in conformity to a pattern to each side of which a sole is fixed with its margin extending beyond the edge of the pattern, a guide adapted to be engaged by the edge of the pattern, opposed supports for holding the margins of the soles against the pattern, a knife having a pair of blades each of which engages a side of one of said supports, a carrier on one end of which said knife is mounted, means for vibrating said carrier whereby said knife is moved crosswise of the edge of the pattern, and means for urging said carrier toward said supports to cause said blades to be yieldingly held in contact with said supports.

6. In a machine for simultaneously trimming right and left soles of a pair in conformity to a pattern to each side of which a sole is fixed, a guide adapted to be engaged by the edge of the pattern, opposed supports for holding the margins of the soles against the pattern, a knife having arcuate blades arranged to engage said supports, a carrier on one end of which said knife is mounted, a pivot concentric with said blades on which said carrier is mounted to vibrate, said pivot being mounted to slide toward and away from said supports, a spring for urging said pivot toward said supports whereby said knife is yieldingly held in contact with said supports, and means for vibrating said carrier.

7. In a machine for simultaneously trimming right and left soles of a pair in conformity to a pattern to each side of which a sole is fixed, a guide adapted to be engaged by the edge of the pattern, a vibrating knife carrier, a knife mounted on said carrier and having blades arranged to project therefrom in opposite directions, and opposed supports one of which is associated with each of said blades, one of said supports being mounted for yielding movement toward and away from the other to accommodate sole-pattern assembles of different thicknesses, said supports and knife being relatively adjustable along the path of the knife to equalize the cutting action of said blades.

8. In a machine for simultaneously trimming right and left soles of a pair in conformity to a pattern to each side of which a sole is fixed with its margin extending beyond the edge of the pattern, a guide adapted to be engaged by the edge of the pattern, opposed supports for holding the margins of the soles against the pattern, a knife, a carrier on which said knife is mounted, said knife having arcuate blades arranged to project in opposite directions from one end of said carrier, a pivot concentric with said blades and about which said carrier is mounted to oscillate, and means for vibrating said carrier.

9. In a machine for simultaneously trimming right and left soles of a pair in conformity to a pattern to each side of which a sole is fixed with its margin extending beyond the edge of the pattern, opposed supports for holding the margins of the soles against the pattern, a knife having arcuate blades arranged to engage said supports, a carrier on one end of which said knife is mounted, said carrier being mounted to oscillate about an axis concentric with said blades, means for vibrating said carrier, and means for varying the path of oscillation of said carrier whereby the mid-position of said knife can be adjusted relatively to said supports.

10. In a machine for simultaneously trimming right and left soles of a pair in conformity to a pattern to each side of which a sole is fixed with its margin extending beyond the edge of the pattern, opposed supports for holding the margins of the soles against the pattern, a knife having blades arranged to engage said supports, a carrier from one end of which said blades project in opposite directions, mechanism for oscillating said carrier comprising a crank and a driving member connecting said crank and carrier, and means for varying the effective length of said driving member whereby the cutting action of the said blades can be equalized.

11. In a machine for simultaneously trimming right and left soles of a pair in conformity to a pattern to each side of which a sole is fixed, opposed supports for holding the margins of the soles against the pattern, a knife having blades arranged to engage said supports, a carrier from one end of which said blades project in opposite directions, mechanism for oscillating said carrier comprising a crank and a driving member connecting said crank and carrier, and an eccentric connection between said carrier and driving member for adjusting the path of oscillation of said knife.

12. In a machine for simultaneously trimming right and left soles of a pair in conformity to a pattern to each side of which a sole is fixed, opposed supports for holding the margins of the soles against the pattern, a knife having arcuate blades engaging said supports and mounted to oscillate about an axis at the center of curvature of said blades, one of said supports being mounted for yielding movement toward and away from the other in accordance with varying thicknesses of the sole-pattern assembly, and means for moving said yielding support toward and away from said knife to maintain contact of said yielding support and knife throughout the yielding movement of said yielding support.

13. In a machine for simultaneously trimming right and left soles of a pair in conformity to a pattern to each side of which a sole is fixed, opposed supports for holding the margins of the soles against the pattern, and a knife having arcuate blades engaging said supports and mounted to oscillate about an axis at the center of curvature of said blades, one of said supports being mounted to swing about two other axes simultaneously whereby it is permitted to yield parallel to itself along the path of said knife in response to varying thicknesses of the sole-pattern assembly.

14. In a machine for trimming right and left soles of a pair in conformity to a pattern to each side of which a sole is fixed, opposed supports for holding the margins of the soles against the pattern, a knife having blades arranged to engage said supports, a guide having spaced shoulders adapted to be engaged by the edge of the pattern at points thereon ahead of and behind the knife with regard to its line of cut, and means for feeding the sole-pattern assembly past said guide, said means being constructed and arranged to exert a feeding force on the sole-pattern assembly directed between said shoulders whereby the pattern is held against said shoulders as it is moved past said guide.

15. In a machine for trimming right and left soles of a pair in conformity to a pattern to each side of which a sole is fixed, a knife having opposed blades each of which is arranged to operate upon one of the soles, a support associated with each blade constructed and arranged to support the margin of each sole inwardly thereof from the line of cut of the knife by engagement with the free side of the sole, a guide having spaced shoulders arranged to be engaged by the edge of the pattern ahead of and behind the knife with regard to its line of cut, and opposed feeding members arranged to engage the free sides of the soles inwardly thereof from said supports, said members being constructed and arranged to impart a feeding force to the sole-pattern assembly directed between said shoulders whereby the pattern is held against said shoulders as it is moved past said guide.

16. In a machine for trimming right and left soles of a pair in conformity to a pattern to each side of which a sole is fixed, opposed supports for holding the margins of the soles against the pattern, a knife having blades arranged to engage the sides of said supports, a guide having spaced shoulders adapted to be engaged by the edge of the pattern at points thereon ahead of and behind the knife with regard to its line of cut, the sides of said blades and supports which engage each other being inclined to the line of cut whereby the cutting action of the knife is directed inwardly of the soles, and means for vibrating said knife crosswise of the edge of the pattern.

17. In a machine for trimming right and left soles of a pair in conformity to a pattern to each side of which a sole is fixed, opposed supports for holding the margins of the soles against the pattern, a vibrating knife having opposed blades each of which is mounted in contact with the side of one of said supports, a guide having spaced shoulders adapted to be engaged by the edge of the pattern at points thereon ahead of and behind the knife with regard to its line of cut, and means for feeding the sole-pattern assembly past said guide with the pattern in engagement with said shoulders, the sides of said supports and blades which engage each other being inclined inwardly of the soles with respect to the direction of the feed movement whereby the cutting action of the knife tends to hold the pattern against said shoulders.

18. In a machine for trimming an insole in conformity to a pattern to which the insole is fixed, a guide adapted to be engaged by the edge of the pattern, said guide having spaced shoulders one of which diverges gradually from a tangent to both shoulders toward the base of the other shoulder, means for feeding the sole-pattern assembly past said guide, said means being constructed and arranged to impart a feeding force to the assembly directed between said shoulders, a knife mounted and arranged to vibrate crosswise of the edge of the pattern, and means for supporting the sole by engagement with its free side against the cutting action of said knife.

19. In a machine for trimming an insole in conformity to a pattern to which the insole is fixed, a guide adapted to be engaged at one side by the edge of the pattern, a knife mounted adjacent to the other side of said guide for movement crosswise of the edge of the pattern, said guide having a shoulder ahead of the cutting edge of said knife and a second shoulder behind the cutting edge of said knife, the first-mentioned shoulder being arranged to diverge gradually from a tangent to both shoulders toward the base of said second shoulder, opposed feeding members adapted to receive the sole-pattern assembly therebetween and arranged to impart a feeding force to the assembly directed between said shoulders, and a support mounted in engagement with said knife and arranged to engage the margin of the sole at its free side.

20. In a machine for trimming a sole in conformity to a pattern to which the sole is fixed, a guide adapted to be engaged at one side by the edge of the pattern, said guide having spaced shoulders and a substantially straight portion which connects the crest of one shoulder with the base of the other whereby said guide between said shoulders diverges from a tangent thereto, a knife mounted adjacent to the other side of said guide between said shoulders, and means for imparting a feeding force to the sole-pattern assembly directed between said shoulders.

21. In a machine for simultaneously trimming right and left soles of a pair in conformity to a pattern to each side of which a sole is fixed, a table for supporting a sole-pattern assembly, a guide adapted to be engaged by the edge of the pattern, a knife, a knife-carrier mounted to vibrate within the space between the planes of the sides of the pattern, said knife having opposed blades arranged to project from said carrier below and above said table, means for supporting the soles by engagement with their free sides against the vibratory cutting action of said knife, and means for feeding the sole-pattern assembly past said knife with the pattern in engagement with said guide.

22. In a machine for simultaneously trimming right and left soles of a pair in conformity to a pattern to each side of which a sole is fixed, a table for supporting a sole-pattern assembly, a guide adapted to be engaged at one side by the edge of the pattern, a knife adjacent to the other side of said guide and having opposed blades arranged to extend below and above said table, an oscillating carrier on one end of which said knife is mounted at its mid-portion, upper and lower supports mounted in engagement with said blades and adapted to support the soles inwardly thereof from the line of cut of the knife, and upper and lower feeding members arranged to engage the free sides of the soles adjacent to said supports, said upper feeding member and support being mounted to yield together toward and away from said lower feeding member in response to variations in the thickness of the sole-pattern assembly.

HANS C. PAULSEN.

No references cited.